Figure 3:
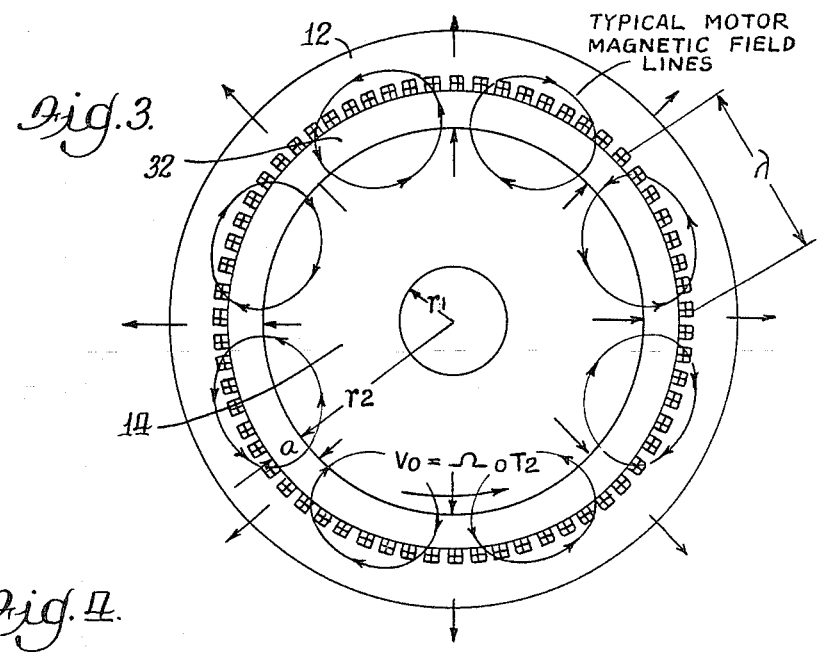

United States Patent [19]

Schaffer

[11] 4,217,171
[45] Aug. 12, 1980

[54] BLANKET DESIGN FOR IMPLODING LINER SYSTEMS

[75] Inventor: Michael J. Schaffer, San Diego, Calif.

[73] Assignee: General Atomic Company, San Diego, Calif.

[21] Appl. No.: 824,558

[22] Filed: Aug. 15, 1977

[51] Int. Cl.² .................................................. G21B 1/00
[52] U.S. Cl. ............................................. 176/7; 176/1; 176/9; 310/10; 310/261; 313/231.3; 315/111.7
[58] Field of Search ............................. 176/1, 3, 7, 9; 313/231.3, 231.4; 315/111.4, 111.5, 111.7; 310/10, 166, 11, 261

[56] References Cited

U.S. PATENT DOCUMENTS

| 2,990,485 | 6/1961 | Lee | 310/11 |
|---|---|---|---|
| 4,076,988 | 2/1978 | Litz | 310/10 |

FOREIGN PATENT DOCUMENTS 2431593 6/1975 Fed. Rep. of Germany ........ 313/231.3

OTHER PUBLICATIONS

Proceedings of the High Beta Workshop, Jul. 28–Aug. 1, 1975, pp. 60–77, Robson et al.
Sixth Symposium on Engineering Problems of Fusion Research, Nov. 18–21, 1975, pp. 983–987, Turchi et al.

Primary Examiner—Harvey E. Behrend
Attorney, Agent, or Firm—Fitch, Even & Tabin

[57] ABSTRACT

Blanket designs comprising hot, molten, rotating liquid vortex systems suitable for rapidly compressing confined plasmas, in which stratified immiscible liquid layers having successively greater mass densities outwardly of the axis of rotation are provided, such that each may be optimized for specific functions.

7 Claims, 14 Drawing Figures

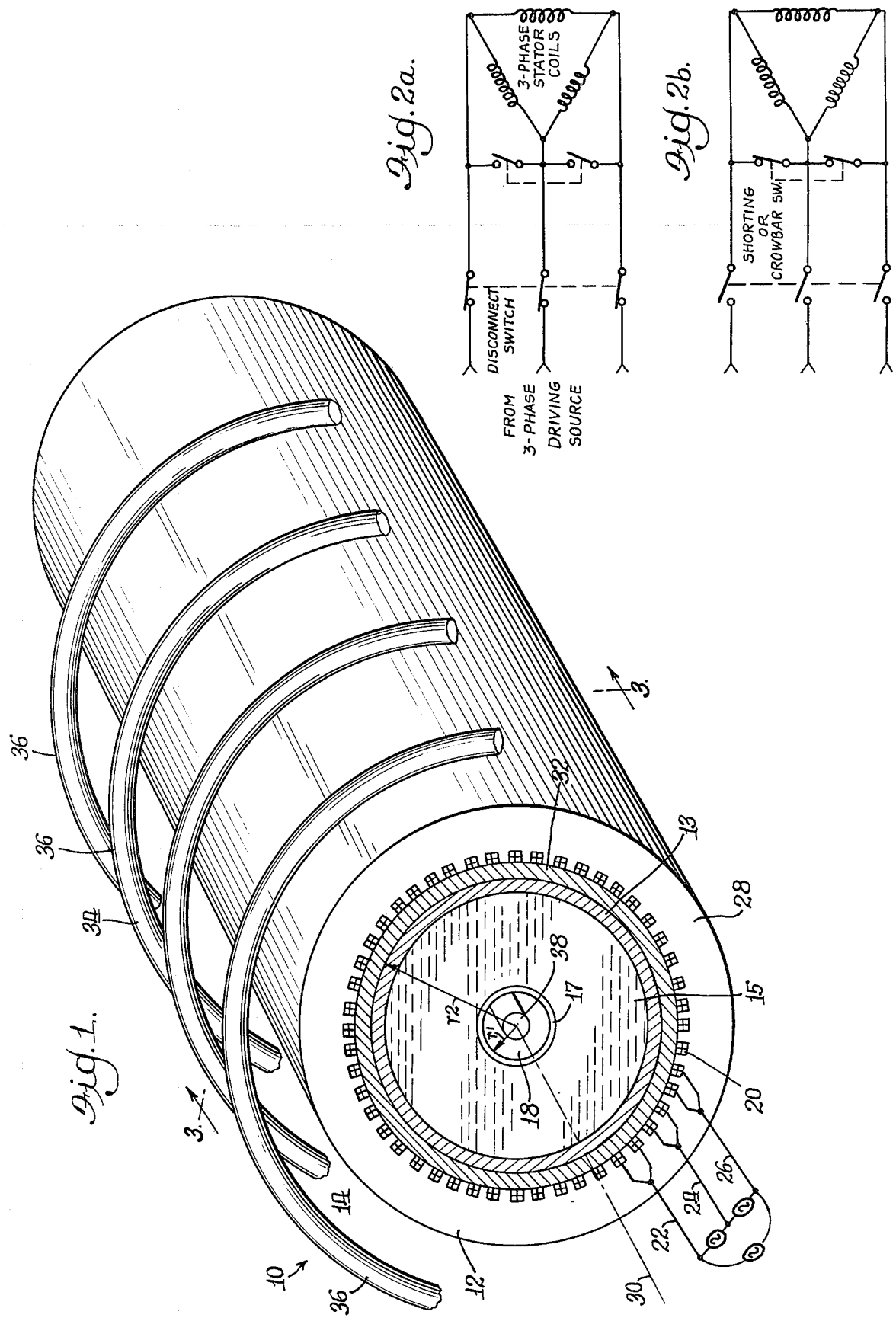

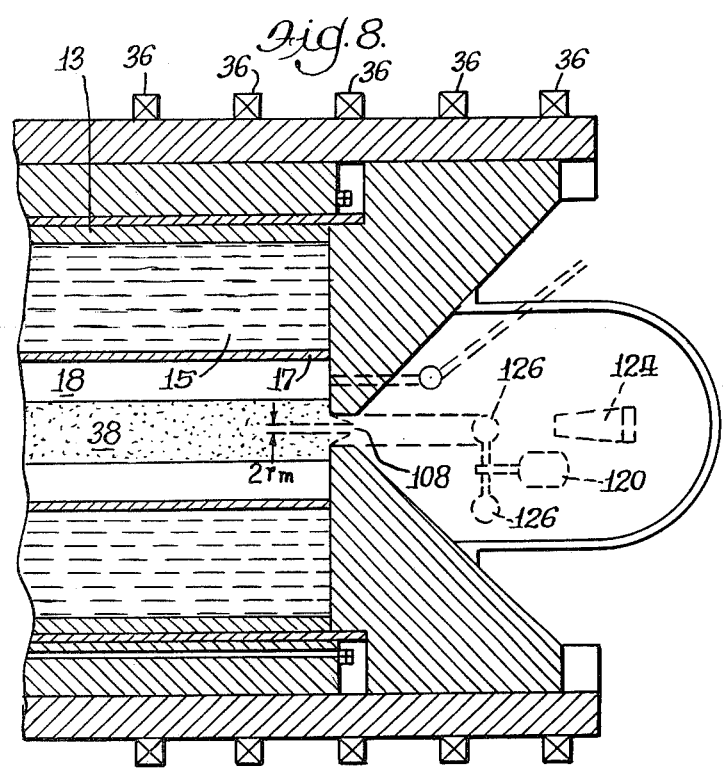
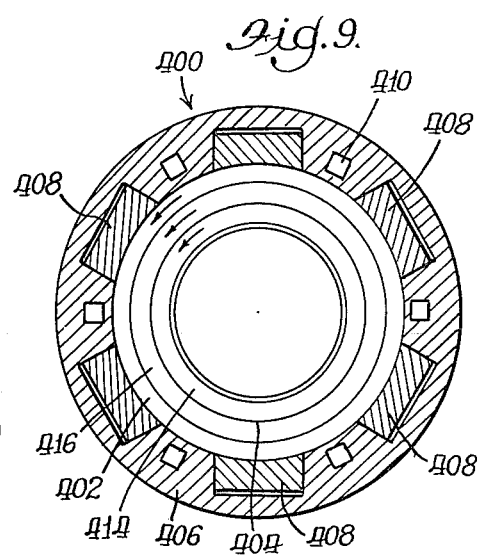
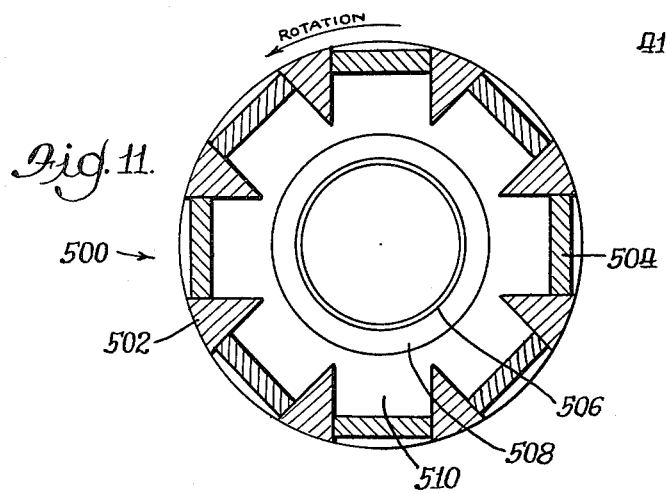
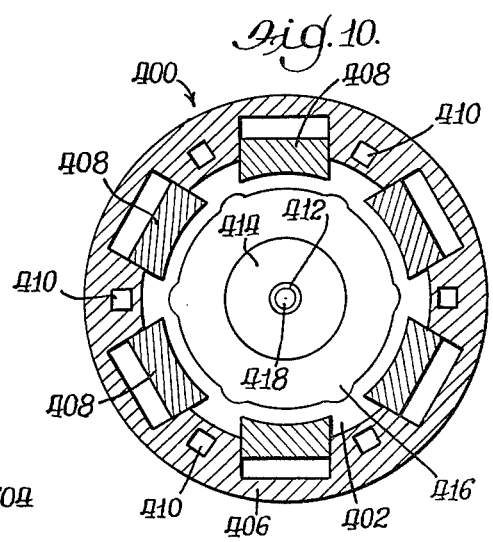
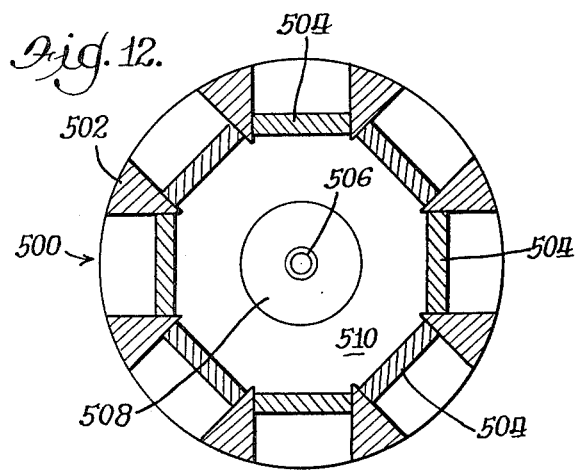
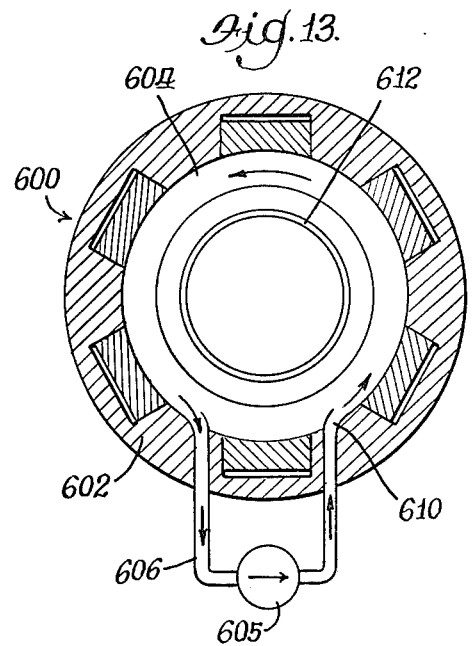

BLANKET DESIGN FOR IMPLODING LINER SYSTEMS

The present invention is directed to blanket designs for plasma confinement systems, and more particularly, is directed to blanket designs for imploding liner magnetic plasma confinement systems in which an imploding, rotating, relatively thick liquid liner is utilized for plasma compression.

Imploding metallic cylindrical liners have been used for many years to compress a trapped axial magnetic field to high (e.g., megagauss) levels [Conference on Megagauss Magnetic Field Generation by Explosives and Related Experiments, Frascati, Sept. 21-23, 1965, Euratom publication EUR 2750.e (1966); H. Knoepfel, Pulsed High Magnetic Fields, American Elservier, New York (1970); bracketed references are incorporated herein by reference]. Furthermore, imploding liners surrounding a magnetically confined plasma configuration have been proposed for plasma compression and heating, and in particular for nuclear fusion purposes. [Linhart, et al., Nuclear Fusion Supp. Pt. 2, 733 (1962)]. Fusion concepts based on imploding liner techniques have been proposed and studied in both the U.S.A. and U.S.S.R. The oldest liner fusion program in the U.S.A. is the LINUS program at the Naval Research Laboratory (NRL) and composite liners have been suggested for the LINUS apparatus. [Boris and Shanny, Proceedings of the 5th European Conferences on Controlled Fusion and Plasma Physics, Grenoble, Aug. 21-25, 1972, Vol. 1, p. 20; R. A. Shanny, et al., Proceedings of the 2nd Topical Conference on Pulsed High-Beta Plasmas, Max Planck Institut für Plasma Physik, Garching, Germany, 1972, p. 205, et seq.; A. E. Robson, NRL Memorandum Report 2616 (1973)].

The use of relatively thick rotating liquid liners was first proposed by T. Ohkawa [T. Ohkawa, Kakuyugo-Kenkyu, Vol. 29, p. 339, et seq. (1973) ; U.S. patent applications of T. Ohkawa Ser. No. 622,089 filed Oct. 14, 1975, and Ser. No. 768,263 filed Feb. 14, 1977 and entitled "Mechanical Compression Plasma Device"]. Such thick, rotating liners present a mechanical impedance level suitable for driving the implosion by hydraulic or pneumatic means, which are capable of providing the large driving energy and high peak driving power required. It has also been proposed that such thick rotating liners could also become self-imploding [M. J. Schaffer, U.S. Patent application Ser. No. 824,556 concurrently filed herewith and entitled "Self-Imploding Liner System for Magnetic Field Compression"; M. J. Schaffer, Proceedings of the International Pulsed Power Conference, Lubbock, Texas, Nov. 9-11, 1976, Paper IIIE-5].

Although any electrically conducting liquid metal will make an effective liner in these latter concepts for the purposes of compressing plasmas or magnetic fields, additional requirements are placed on liners that are intended for systems adapted to approach or reach thermonuclear temperatures, and for nuclear fusion reactors. The liner surface facing the plasma should be a good electrical conductor and have low vapor pressure and low compressibility. There should also be a lithium-bearing region near the plasma to breed tritium if the dueterium-tritium (D-T) fusion reaction is employed. Neutrons produced by the fushioning plasma must be moderated, shielded, and perhaps reflected. If a rotating magnetic induction field is used to rotate the liner, there should be an electrically conducting liquid in the outer region of the liner, near stationary A.C. induction coils (see Ohkawa and Schaffer patent applications previously cited), but there should be an electrical nonconductor or poorly conducting liquid between the stator and the conducting liquid to reduce magnetohydrodynamic losses. Some embodiments of the self-imploding liner (see Schaffer patent application previously cited) also utilize an additional nonconducting fluid between the conducting inner liner and the outer conducting liquid for inductive rotation and magnetic driving.

It has been suggested that many radioactive wastes from fission reactors could be transmuted effectively by fusion neutrons in a liner fusion system.

Many different radioactive waste products are generated by fission reactors. The short-lived species may be eliminated most economically be natural decay during shortterm storage. Of the longer lived fission products, cesium[137], strontium[90], promethium[147], cesium[134], krypton[85] and europium[154] have been identified as the highest activity isotopes from a typical pressurized water reactor which remain after a ten year decay or "cooling" period in descending order of activity. [W. C. Wolkenhauer, "The Controlled Thermonuclear Reactor as a Fission Product Burner", BNWL-SA-4232]. Cesium[137] and strontium[90] wastes are reported to constitute about ten times as much activity as any of the other isotopes listed [D. Steiner, "Some Preliminary Observations Concerning the Potential of Fusion Reactors as Radioactive-Waste Burners", ORNL, FTR-MEMO-71 (June 7, 1971)]. It has also been suggested the lower activity but long-lived technetium[99] and biologically significant iodine[129] are potential candidates for inactivation treatment through transmutation. [W. C. Gough, Fusion Reactors as Radioactive Waste Burners, informal collection of memos circulated by AEC-DCTR in July, 1971]. However, such isotopes present difficulties as wastes because their neutron cross sections are low at thermal neutron energies, and even at fission neutron energies. On the other hand, many isotopes have (n, 2n) cross sections of about 1 barn at neutron energies above about 10 million electron volts (MeV).

Furthermore, nuclear fission reactors produce varying mixes of transuranium isotopes, the most abundant of which is plutonium. Although it may become conventional practice to separate and recycle such transuranium isotopes as fissile fuel, an amount of such elements depending on the chemistry of reprocessing plants and other factors will remain in the fuel wastes. Plutonium[240] and plutonium[242] have negligible thermal neutron fission cross sections, but have fission cross sections of about 1.5 barn at neutron energies above about 1 MeV. At neutron energies above about 6 MeV, the (n, 2n) processes become energetically possible and can be on the order of a barn.

Figure 4:
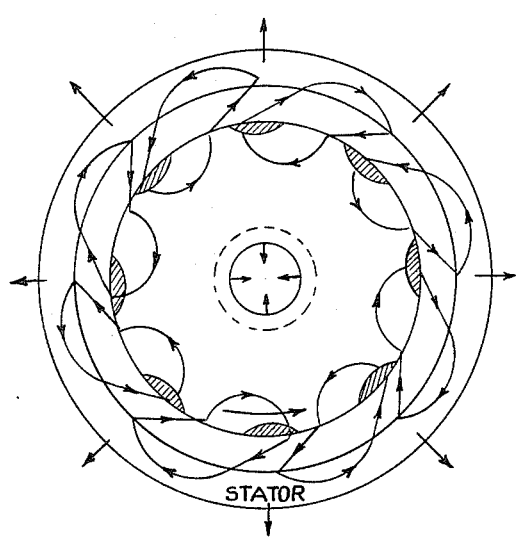
Figure 5:
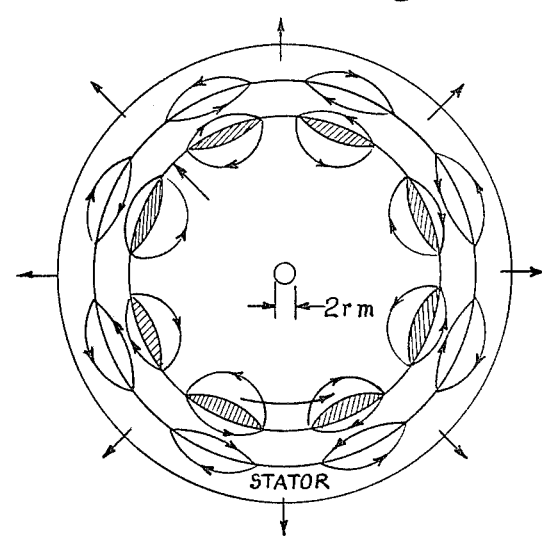
Figure 6:
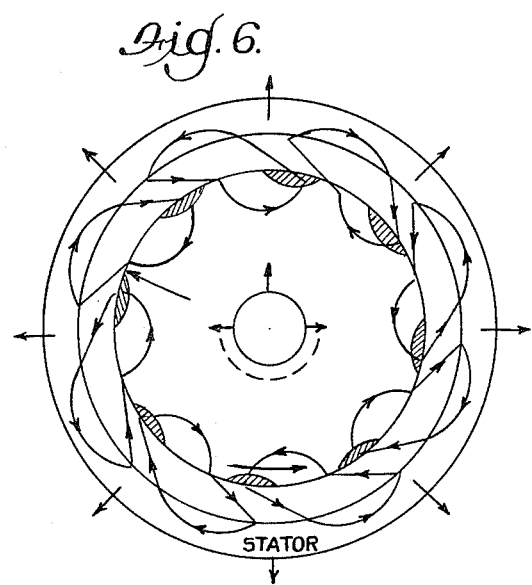
Figure 7:
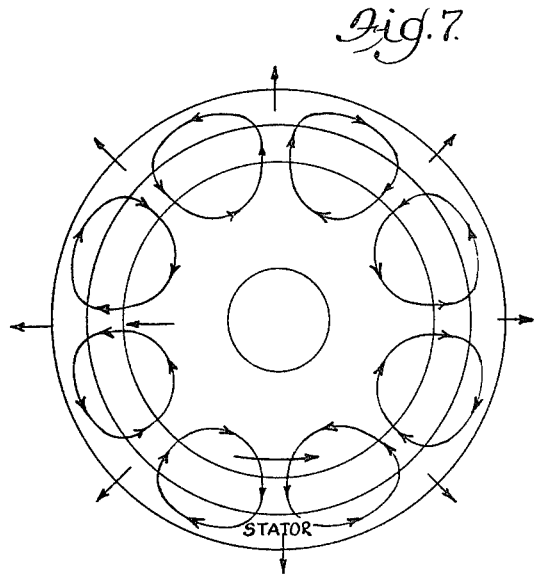

It is desirable that there be provided improved liquid blanket designs for imploding liner plasma confinement and compression systems. It is a further object to provide such designs which may be adapted for disposing of or inactivating radioactive waste materials. These and other objects will become apparent from the following description and the accompanying drawings of which:

FIG. 1 is a perspective view, partially broken away, of an imploding liner compression apparatus embodying a blanket design in accordance with the present invention, FIGS. 2a and 2b are schematic electrical circuit diagrams of the apparatus of FIG. 1, FIG. 3 is a cross sectional view of the apparatus of FIG. 1 taken through line 3—3, and illustrating magnetic field lines while the liner is being rotated by the magnetic field of the stator and at the beginning of an implosion cycle, FIG. 4 is a view like that of FIG. 3 illustrating magnetic field and liner configuration about half way through implosion, FIG. 5 is a view like that of FIG. 3 illustrating magnetic field and liner configuration at the end of implosion (peak compression), FIG. 6 is a view like that of FIG. 3 illustrating magnetic field and liner configuration during rebound of the system from peak compression, FIG. 7 illustrates the magnetic field and liner configuration at the end of one complete cycle with respect to FIG. 3, FIG. 8 is a cross sectional view illustrating the end configuration of the apparatus of FIG. 1, FIGS. 9 and 10 are cross sectional views of another apparatus employing an embodiment of blanket design in accordance with the present invention, FIGS. 11 and 12 are cross sectional views of a further apparatus illustrating the present invention; and FIG. 13 is a cross sectional view of another apparatus which utilizes a blanket design in accordance with the present invention.

Generally, the present invention is directed to rotating liquid stratified liner systems for imploding liner plasma apparatus comprising a plurality of stratified immiscible layers of different materials, including an intermediate molten salt layer, the respective layers having progressively greater mass density with increasing radius from the axis of longitudinal rotation. The blanket systems are maintained in equilibrium by the centrifugal field generated by the liner rotation. Different layers of the stratified liner system may consist of materials which accomplish one or more system functions in a more favorable or optimum way than could be accomplished by a liner consisting of a single homogeneous liquid.

For example, molten aluminum is an excellent material for a plasma-compressing liner layer that faces the plasma, due to its high electrical conductivity, low vapor pressure, and low compressibility. (Copper has superior properties in this regard, but has the disadvantage of high mass density and high melting point, which makes its incorporation into the stratified liner system more difficult). Liquid lithium also has low vapor pressure and good electrical conductivity, but its high compressibility limits its application to thin layers when high pressures are to be generated. The compression liner layer may be relatively thin for example, at least about 0.5 cm, but less than about three centimeters in the compressed configuration. Such a thin liner layer will only slightly attenuate neutrons from a fusioning plasma. The next layer may be a tritium breeding and neutron moderating layer, comprising for example, a mixture of fused lithium and beryllium fluorides adjusted to have a mass density greater than that of the flux-compressing liner. Many fission reactor wastes may desirably also be incorporated into such a layer in the form of their fluoride or other halide salts, giving a single homogeneous fused salt solution, if waste transmutation is an objective. The mass density and the melting point of the liquid salt layer may be adjusted by varying the composition and constituents of the solution. The next layer may, for example, be a neutron and radiation shield, such as a liquid layer comprising a molten heavy alloy of metals such as lead and cadmium. Such molten metals may be provided with a sufficiently high electrical conductivity to permit rotation of the liner system by magnetic induction, if desired. In this case, a thin outer layer of a dense salt such as fused mercurous fluoride ($Hg_2F_2$) and/or lead fluoride ($PbF_2$), which are poor electrical conductors having mass densities in excess of 8 $gm/cm^3$, may be utilized to reduce magnetohydrodynamic losses. If such a magnetohydrodynamic loss-reducing layer is used, care must be taken to insure that the desired inner layers are less dense. For example, part of the lead or other heavy metal in an inner shield layer might have to be replaced by a lower mass density metal, such an aluminum, to give a total mass density less than 8 $gm/cm^3$.

Furthermore, the individual constituents of the stratified liner system should be selected to minimize any chemical reactions between the layers.

In nuclear waste treatment applications of the stratified liquid blanket system, an axial magnetic field is provided in the plasma confinement zone together with a fusible plasma such as a deuterium-tritium plasma. The rotating blanket mass is then rapidly compressed to compress the axial magnetic field and the fusible plasma and to generate a thermonuclear neutron flux in the plasma compression zone. The radioactive waste materials of the rotating blanket mass are subjected to the neutron flux to transmute the waste to less radioactive materials.

Apparatus utilizing the stratified blanket liner design of the present invention will generally comprise means for confining and rotating the liner to produce an axial vortex zone within the liner and to stratify the liner, means for producing an axial magnetic field within the axial vortex zone, and means to rapidly implode the rotating blanket to compress the axial magnetic field. The apparatus may also comprise means for providing a plasma such as a fusible D-T plasma in the vortex zone such that the vortex zone is a plasma confinement zone in which the plasma is compressed to thermonuclear temperature.

The utilization of magnetic fields to force a plasma inwardly to a constricted volume and substantially increase the temperature and the density of the plasma is conventionally referred to as an application of the "pinch effect" and is described in much of the literature directed to plasma generation, confinement and study, particularly as it relates to controlled thermonuclear reactions and nuclear fusion. Imploding liners utilizing a magnetic pinch plasma confinement system have been proposed for pulsed plasma compression and nuclear fusion purposes, and have been used extensively for the production of very strong magnetic fields and highly compressed gases.

As indicated, the apparatus comprises a thick, stratified liquid liner and means for rotating and confining the liquid liner. In certain systems, the liner rotating means may function as an induction motor stator for rotation of the liner. In such systems, the induction motor stator means (provided with a suitable electric power source) produces a rotating magnetic field configuration within the stator and induces an opposing current in the electrically conductive liner means. Rotational torque to drive the liner at a desired angular rotational velocity is thus provided. As indicated previously, in such induction-rotated blanket systems, there will necessarily be provided a liquid metal for induction-coupling near the outer periphery of the liquid liner system.

The liner rotation may also be provided by rotation of the means for containing the liner, or by means for pumping the liquid liner about the periphery of the containment means, as will be described in more detail hereinafter.

Such systems also generally comprise means for rapidly imploding the rotating liner to compress the axial magnetic flux in the liner vortex zone, and to compress the plasma to thermonuclear temperature. Such implosion means may comprise mechanical compression means such as described in the previously referred to Ohkawa applications. The implosion means may also comprise magnetic implosion means such as described in the concurrently filed Schaffer application.

As also indicated, the present invention is particularly directed to thick stratified liquid liners comprising a plurality of layers of different density arranged in order of increasing density with increasing radial distance from the axis of rotation, and which are adapted to provide particular liner functions in respect of layer position in the liquid liner. For example, in this connection the liner may comprise a relatively low density liquid metal magnetic flux-trapping inner layer, a molten salt intermediate layer having a density greater than that of the flux-trapping layer and surrounding the flux-trapping layer, and an outer liquid metal layer of still higher density which may function as an induction-coupling layer and/or a neutron shield layer. These layers may be divided into sublayers for particular purposes as will become apparent in connection with the descriptions of the systems shown in the drawings.

Turning to the drawings, the present invention will now be more particularly described with respect to the embodiment of apparatus shown in FIG. 1, which is a perspective view, partially broken away, of plasma compression and confinement apparatus 10 illustrating various features of the invention. The illustrated apparatus 10 comprises stator means 12 defining a cylindrical bore for confining stratified liquid liner 14 and for providing a rotating magnetic field therein to rotate the liner 14. The liner and the stator means function as an induction motor to provide for rotation of the stratified liner within the bore in accordance with known principles of induction motor operation [e.g., D.C. Fink, et al., Standard Handbook for Electrical Engineers, Section 18, McGraw Hill, New York (10th ed., 1969), and other induction motor texts].

The stratified liquid liner 14 is confined within the cylindrical bore defined by the internal wall 16 of the stator means 12, and comprises an outer inductive-coupling liquid metal layer 13 of relatively high density such as mercury, copper, lead, tin and cadmium, including alloys, mixtures and/or sublayers thereof. The outer layer in the system of FIG. 1 serves to inductively couple the liquid liner with the stator means, and thus should have relatively good conductivity in the liquid state. Internally of the inductive-coupling layer is a relatively thick intermediate molten salt layer 15 comprising salts of radioactive waste materials and tritium breeding salts. Internally of the waste materials to be treated, there is provided a relatively thin liquid metal flux-trapping conductive layer 17.

The total volume of the stratified liquid liner within the bore of the apparatus 10 is insufficient to completely fill the bore at the temperature conditions of operation (e.g., at least the melting temperature of rotor materials intended to be in a fluid state). Upon rotation of the liner, centrifugal force effects cause the component materials to be forced radially outward against the inner wall 16 of the stator means 12, leaving an axially symmetrical cylindrical vortex zone 18 as the compression zone at the center of the bore 14 for plasma confinement, and centrifugally separating and forming layers of the various materials, with the density being a function of radial distance from the axis of rotation 30, the lower density materials being positioned toward the axis, and the higher density materials being positioned near the periphery. The initial formation of the layered structure may be carried out by introducing (as by pumping in the direction of intended rotation) the heavier outer induction-coupling layer in a liquid state into the bore of the stator means and inducing rotation by operation of the stator system. After the outer layer is rotating at a suitable velocity to be distributed in a relatively uniform cylindrical layer, the material for the inwardly next layers may be similarly introduced into the bore.

In the illustrated embodiment the uncompressed inner radius $r_1$ of the rotating liner 14 will normally be in the range of from about 25 cm to about 100 cm depending on the compression volume and compression ratio desired. Since the inner surface 15 of the rotating liner means 14 is formed by rotational forces, it will be of circular cylindrical shape of uniform circular cross-section and concentric with the stator. As indicated, the liquid liner is relatively thick, and in this connection the ratio of the outer radius $r_2$ to the inner radius $r_1$ of the rotating liner 14 will be at least about 3, and preferably in the range of from about 4 to 6. In the illustrated embodiment, the outer radius $r_2$ of the liner 14 will best be in the range of from about 1 to about 6 meters.

As indicated, the liner 14 is confined and caused to rotate by inductive interaction with a rotating magnetic field configuration provided by the stator system 12. In this connection, the illustrated stator 12 is adapted to provide a multipolar magnetic field configuration in the rotor zone internally of the bore by means of a primary motor winding 20, which in the illustrated embodiment may be arranged for a multiphase power supply (such as a three-phase supply) with a corresponding plurality of sets (such as three) of exactly similar multipolar conductor groups spaced $1/n$ of a pole pitch apart, where n is the number of phases. The superposition of the plurality of stationary but alternating magnetic fields produced by the multiphase windings produces a sinusoidally distributed multipolar magnetic field revolving in synchronism with the power supply frequency. Generally, the stator should best have from at least six poles to about 20 poles and in the illustrated embodiment, a three-phase, sixteen pole stator winding is shown comprising forty-eight conductive coils arranged in phase groups 22, 24, 26 which are regularly spaced in azimuthally symmetrical array about the inner periphery of the stator casing 28. The stator casing 28 may be constructed of a material such as laminated motor steel, and should, of course, be sufficiently strong to withstand the rotational, compressive and expansive forces generated by the apparatus 10. The coils 22 supplied with one phase of the power supply, the coils 24 supplied with the second phase, and the coils 26 supplied with the third phase, are adjacent and spaced one-third of a pole pitch apart in the illustrated embodiment. The coil conductor windings extend longitudinally of the axis 30 of the apparatus 10 so as to create a cylindrical field configuration. The end connections, power connections and other aspects of the three-phase windings 22, 24, 26 and associated stator design may generally be in accordance with induction motor art. Particular end connection features are shown schematically in FIG. 1.

At the interior surface of the casing 28 of the stator means 12 is an electrically insulating layer 32 of cylindrical shape which separates the magnetic circuits of the stator and liner.

A plasma 38 is created in the cylindrical vacuum space 18 by some appropriate means such as a laser beam, high energy electron beam, gas discharge or plasma system, such as shown in FIG. 8. In the illustrated embodiment, high efficiency coaxial plasma guns 124 are employed for producing plasma. Such guns are well known [e.g., "Plasma Deflagration and the Properties of a Coaxial Plasma Deflagration Gun", D. Y. Cheng, Nuclear Fusion, 10, (1970) p. 305], and are capable of being scaled up to large sizes and energy ratings ["Scaling of Deflagration Plasma Guns", Cheng, et al., Bull, APS, Series II, 10, (1975), p. 1348]. Ablator spheres 126, rotated by motors 120, are synchronized to pass in front of the plasma guns 124 after injection, but before the plasma has been greatly heated and compressed, to protect the plasma guns from high energy plasma escaping through holes 108. A time interval of about 3 msec exists to accomplish this, requiring that the ablator be rotated at about 3000 to 4000 rpm in this example. The injected plasma will expand into the vacuum region 58 until a pressure balance at $\beta=1$ is reached between the plasma and the initial axial magnetic flux from coils 36 trapped by the conducting liner. The axial magnetic field thus insulates the plasma 38 from the inner surface of the liner, just as in a conventional theta pinch plasma discharge.

A relatively cold gas or plasma may be used to plug the ends of the plasma compression zone to increase the plasma confinement time as described in the above incorporated Ohkawa applications. The plasma may be of a material such as hydrogen, including $H^1$, $H^2$ and $H^3$ and should best be a fusible deuterium-tritium plasma for the most effective generation of neutron flux.

The coils 22, 24, 26 of the illustrated embodiment, in conjunction with the power supply are adapted to provide a steady rotation of the liquid liner 14 in the illustrated embodiment at an appropriate angular velocity at least sufficient to create the cylindrical (vortex) compression zone, which velocity depends on the mass density of the liner materials, the peak value of the compressed magnetic field, the radius of the inner surface 15 of the liner at the moment of peak compression and on the compression ratio. The rotational velocity may, for example, range from about 50 rpm for large diameter mercury liners to higher rpm values for smaller or lighter liners. The field strength that is provided by the stator coils 22, 24, 26 which is the illustrated embodiment may be about 0.1 T (e.g., 1,000 gauss), should be sufficient to accommodate the turbulent viscous losses.

The apparatus 10 also has means 34 for producing a magnetic field longitudinally of the axis of rotation of the stratified liquid liner, and in the illustrated embodiment, such means comprises an electrically conductive, magnet coil 36 which axially encircles the stator 12 for providing a relatively uniform axial magnetic field, which may, for example, be in the range of from about 500 to about 2000 gauss (or more) in the illustrated embodiment along the length of the bore parallel to the axis 30. Coils 36 of the axial field means 34 carry electric current around the apparatus in the azimuthal direction as shown and produce a steady magnetic field within the bore. The spacing and design of the coils 36 may result from consideration of factors such as field homogeneity in the rotating liner 14, access to the portions of the apparatus between adjacent coils 30, the field strength limitations of conducting or superconducting materials, and various other structural considerations which are within the skill of the art in view of the present disclosure. The power supply to the azimuthal coils 36 of the illustrated embodiment may be provided by any suitable source of direct current.

To compress the longitudinal magnetic field, liner-generated magnetic forces are utilized to drive the liner 14 inward as will now be described in more detail.

Prior to initiating an implosion, the liner 14 is induced to rotate in the induction motor stator 12 at predetermined rotational velocity which may generally be nearly synchronous with the rotational velocity of the stator field, which is determined by the frequency of the external three phase driving source indicated in FIG. 2a. Therefore, the motor field will have substantially fully permeated into the liner 14, as shown in FIG. 3. This magnetic flux is, thus, temporarily frozen in the liner. To initiate an implosion, three-phase driving source is disconnected from the stator, and the stator coils are all rapidly and simultaneously short-circuited, as shown in FIG. 2b. This has the effect of temporarily freezing or tapping the magnetic flux of the stator in the stator, and it abruptly stops the rotational velocity of the stator field to produce a stationary field configuration within the stator. However, the liner 14 and the magnetic field configuration associated therewith, continues to rotate due to rotational kinetic energy of the liner, as shown in FIGS. 3–7. In effect, the liner acts as the rotor of an alterator that has been suddenly short-circuited and whose very large short-circuit electric current generates a correspondingly large magnetic field in the insulating gap, and the force of this large magnetic field exerts a compressive force on the liner.

FIGS. 3–7 are cross-sectional views taken along the axis 30 of the apparatus 10 of FIG. 1 and illustrate the magnetic field configuration of the liner 14 and the stator 12 and the insulating layer or gap 32 at various points in an implosion cycle. In FIGS. 3–7, the stator 12 and its magnetic field are stationary, and the rotational direction of the liner 14 and its magnetic field configuration is counterclockwise. These aspects of the operation of the apparatus 10 are more fully explained in the concurrently field Schaffer application.

As the outer portion of the liner is forced inward, a corresponding volume decrease is provided in the compression zone 18, at the center of the liner 14. This decrease of volume of compression zone 18 compresses the axial magnetic field provided by coils 36, and thereby increases the axial magnetic flux density. In this connection, the rotating liquid conductive liner means, in accordance with the well-known Faraday's law of electromagnetics, will trap or conserve the longitudinal magnetic flux within the hollow vortex regional compression zone 18, so that when the liquid liner is compressed the cross-sectional area of the vortex compression zone 18 is reduced, thereby compressing the trapped longitudinal magnetic field into a smaller volume and increasing its strength, in accordance with the conservation of magnetic flux. FIG. 5 illustrates the magnetic configuration of the system of FIG. 1 when the liner field has advanced into direct opposition with the stationary short-circuited stator field.

As indicated, the apparatus employs a liquid rotating liner in which stratified, preferably immiscible, layers of fluid, which each may be individually optimized for specific blanket functions, are maintained in radially layered relationship by the centrifugal field. In this connection, a flux compressing liner of an electrically conductive material is disposed adjacent the axial plasma zone. Since the liner is fluid, the azimuthal motion of the liner fluid and the coupling between the fluid and its trapped magnetic flux from the stator are governed by shear Alfven wave motion [H. Alfven, Cosmical Electrodynamics, Clarendon Press, Oxford (1950), Chapter 4]. As a result, the provision of liquid liner design in accordance with the present invention with at least three principal layers of immiscible, stratified liquids is particularly advantageous. Since it is desired to compress magnetic flux in the compression zone in order to compress the plasma therein, the innermost liquid 102 of the illustrated embodiment should be a molten, electrically conductive metal (e.g., lithium, sodium-potassium alloy, magnesium or aluminum) to trap and compress the longitudinal magnetic flux as previously described. The intermediate molten salt layer is electrically a poor conductor, and denser than the innermost flux-trapping liquid layer. The outermost induction-coupling liquid layer 106 must be electrically conductive and is preferably much denser than the other two liquids (e.g., molten, copper, lead, mercury, etc.). The Alfven waves are reflected from the insulating interface 105. Thus the stratified liner design prevents large amounts of driving energy from being transported via Alfven waves and lost to the interior of the liner.

Molten aluminum is an excellent material for the flux-compressing liner immediately adjacent the axial plasma zone. Copper is more efficient but its greater mass density and melting point make its incorporation into the stratified molten blanket more difficult. The conductive flux compressing liner may be relatively thin, (e.g., from about 0.5 cm to about 3 cm in thickness when fully compressed) and accordingly may only slightly attenuate neutrons from a fusing plasma, thereby providing for substantial neutron flux radially outwardly of the flux compressing liner for interaction with the molten salt intermediate liner layer comprising a mixture of fused lithium and beryllium halide salts adjusted to have a density greater than that of the flux-compressing layer. Salts of fission reactor wastes such as radioactive strontium and cesium halides and transuramic isotopes, may also be incorporated into the liquid salt of the blanket design for transmutation into stable isotopes, as will be more fully explained hereinafter.

Constituent components of the blanket should be selected for low rates of chemical reaction between adjacent layers, so that chemical reprocessing of the blanket materials for blanket maintenance may be minimized.

As indicated previously, the liquid, stratified blanket systems of the present invention may be advantageously used with other types of imploding liner apparatus in addition to induction-self-compressing systems. Another embodiment of means 400 for rotating, confining and imploding a stratified liner system is illustrated in the compressed and uncompressed states in FIGS. 9 and 10, respectively. A dense nonconducting liquid layer 402 is incorporated to permit efficient inductive rotation of the stratified liner 404 within the stationary piston-bearing structure of the apparatus 400 such as described in the previously referred to Ohkawa patent application. The apparatus 400 comprises a stationary confinement cylinder 406 including implosion pistons 408 and induction stator windings 410 symmetrically arranged about the cylinder. The pistons need not be round, and, for example, may be elongated in a direction along the axis of rotation of the system. The number of pistons distributed around the azimuth may be as large as convenient to design, with larger numbers being preferable; multiples of 4 or 6 are preferable with induction drives.

The stratified liner comprises a conducting, flux compressing inner layer 412 of a molten metal such as aluminum or lithium, a fused salt breeding and/or transmuting layer 414 and a heavy molten metal shield and rotation layer 416. In order to implode the liner system, a high pressure gas is used to drive the pistons inwardly to the configuration of FIG. 10 to compress the plasma volume 418.

Representative dimensions for the apparatus of FIGS. 9 and 10 are as follows:

|  | Initial State | Final State |
| --- | --- | --- |
| Plasma volume radius | 1.0 m | 0.03 m |
| Flux compressing layer thickness | 0.5 mm | 14 mm |
| Radius of interface between shield and drag reducing layers | 1.4 m | 0.95 m |
| Stator inner radius | 1.9 m | — |
| Piston stroke | 0.5 m | — |

Another embodiment of apparatus suitable for use with the stratified liner system of the present invention is the NRL apparatus 500 [D. L. Book, et al., IAEA 6th Conference on Plasma Physics and Controlled Nuclear Fusion Research, Berchtesgaden, Germany, Oct. 6–13, 1976, Paper CN-35/E19-1] such as shown in FIGS. 11 and 12. The NRL apparatus utilizes a strong rotating drum 502 or pressure vessel to contain and rotate the liner system. The liner is driven inward by gas-driven pistons 504 moving in cylinders contained in the drum. The stratified liner system shown contains the following three layers: an innermost conducting layer 506 of liquid aluminum or lithium for plasma compression, a liquid salt $LiF\text{-}BeF_2\text{-}PbF_2$ tritium breeding and neutron moderating blanket layer 508 and liquid metal Pb-Cd-Al shield layer 510.

Representative dimensions for the apparatus of FIGS. 11 and 12 which are shown in cross section through a row of piston cylinders, are as follows:

|  | Initial State | Final State |
| --- | --- | --- |
| Plasma volume radius | 1.0 m | 0.03 m |
| Al or Li flux compressing layer thickness | 0.5 mm | 14 mm |
| Radius of interface between shield and breeding layers | 1.25 m | 0.7 m |
| Drum inner radius | 1.4 m | — |
| Piston stroke | 0.5 m | — |
| Drum outer radius | 2.4 m | — |

Still another embodiment of imploding liner apparatus 600 which may be used within the stratified liner systems of the present invention is illustrated in FIG. 13, where the liner system is rotated within a stationary, piston-containing pressure vessel 602 by multiple jets of recirculated liquid from the outer heavy metal shield layer 604 of the liner system. The multiple jets (only one of which is shown in the FIGURE, are provided by receiving the outermost liquid metal into an inlet 606, pumping the liquid by means of pump 608, and reintroducing the pumped liquid in the direction of desired rotation by means of an outlet jet 610.

Representative dimensions for the apparatus such as that of FIG. 13 which is illustrated in the manner of FIGS. 9–12, are as follows:

|  | Initial State | Final State |
|---|---|---|
| Plasma volume radius | 1.0 m | 0.03 m |
| Al or Li flux compressing layer thickness 612 | 0.5 mm | 14 mm |
| Radius of interface between shield and breeding layers | 1.25 m | 0.7 m |
| Stator inner radius | 1.9 m | — |
| Piston stroke | 0.5 m | — |

In the course of operation, a fusing D-T plasma of the illustrated embodiments produces a neutron flux which may be utilized to interact with radioactive wastes of the intermediate molten salt layer of the stratified rotating liner to transmute the wastes to more desirable elemental species.

The mean residence time $\tau$ of an isotope in the transmuting reactor 10, 300, 400, or 500 may be represented by $$\tau = <\Gamma_n \sigma>^{-1}$$

where $\Gamma_n$ is the neutron flux, $\sigma$ is the sum of all nuclear cross sections that result in transmutation, and the average is over time, space and the neutron-energy spectrum. For purpose of the following discussion, the cross section $\sigma$ may be assumed to be one barn.

In order to provide significant improvement over simple storage, then the mean residence time $\Gamma$ should be considerably smaller than the natural exponential decay rate, $\tau_{nat} = \tau_{\frac{1}{2}}/0.693$. For example, in respect of cesium $^{137}$, the half life $\tau_{\frac{1}{2}}$ is about 30 years, and $\tau_{nat} = 1 \times 10^9$ seconds, while for strontium $^{90}$, the half life $\tau_{\frac{1}{2}}$ is about 28 years. Assuming $\tau_{nat}$ to be about $1 \times 10^9$ seconds for the radioactive waste materials to be treated, then the average flux $\overline{\Gamma}_n$ must exceed $1 \times 10^{15}$ cm$^{-2}$s$^{-1}$ to provide significant improvement over storage. Alternately, if the average neutron flux $\overline{\Gamma}_n$ were $1 \times 10^{16}$ cm$^{-2}$s$^{-1}$, then the mean residence time $\tau$ would be about $10^8$ seconds, or 3 years. The desired neutron flux will depend on balancing of the capital cost of burner reactors against the costs of storage (economic and other). In any event, the waste burner such as the apparatus 10 of the drawings should be a high flux device, which indicates that waste burning should employ reactors optimized for high flux performance.

The high density plasmas of imploding liner plasma confinement apparatus such as apparatus 10 may be employed to produce large neutron fluxes, and the molten blanket which does not suffer from the usual neutron displacement-induced common to all solid substances, is compatible with such high neutron fluxes. Furthermore, the thin flux-compressing liner layer may be regarded as not substantially attenuating the neutron flux. In connection with the provision of a high flux burner reactor, the neutron production rate $R_n$ per unit length of plasma column in an apparatus such as illustrated in FIG. 1 having a plasma column radius $r_p$, may be represented as:

$$R_n = \pi r_p^2 n_{D,T}^2 <\sigma_{DT}v>$$

$$R_n \propto (nT)^2 r_p^2 <\sigma_{DT}v> T^2$$

$$R_n \propto B^4 r_p^2$$

where in going to the last proportionality, use is made of the fact that the quantity $<\sigma_{DT}v>/T^2$ is fixed within a factor of 2 for all deuterium-tritium ignition reactors. The neutron flux $\Gamma_n$ may be represented by the following expression:

$$\Gamma_n \approx R/2\pi x_n$$

where $x_n$ is the neutron mean free path in the liquid liner blanket. Assuming $\sigma$ is approximately $10^{-24}$ centimeter and $n_{blanket}$ is approximately $4 \times 10^{22}$ cm$^{-3}$, we see that the mean free path in the blanket $x_n$ is on the order of about 25 centimeters. Since $x_n$ is not subject to substantial design variation or control, $$\Gamma_n \propto (r_p B)^2 B^2.$$

Since the plasma compression energy per unit length, an engineering parameter of major importance in linear implosion plasma system designs, is proportional to $(r_p B)^2$, it is observed that high neutron flux is obtained most readily by employing the highest magnetic field possible.

The neutron dose rate is $\dot{N}_n = RL$, where L is the effective length of the plasma column. In a conventional implosion reactor $L \propto n_{DT}^{-1}$, so $$\dot{N}_n \propto n_{DT} T^2 r_p^2.$$

Scaling at fixed temperature, $$\dot{N}_n \propto (r_p B)^2 \propto (r_p^2 B^2 L)/L$$

Since the total compression energy is proportional to $(r_p^2 B^2 L)$, the highest neutron dose rate is obtained with relatively short, but high density reactors.

The neutron pulse is short lived. The liner dwell time $\tau_d$ and neutron pulse derivation scale as $$\tau_d \propto r_p \rho^{\frac{1}{2}}/B$$

where $\rho$ is the blanket mass density.

In some embodiments of imploding liner plasma compression apparatus, the repetition rate of the liner compression means may be limited by external factors peculiar to the compression driver, and as to such apparatus time average flux and dose scaling may be represented as:

$$\overline{\Gamma}_n \propto \Gamma_n \tau_d \propto (r_p B)^3 \rho^{\frac{1}{2}}$$

$$\overline{N}_n \propto r_p^3 B \rho^{\frac{1}{2}} \propto (r_p^2 B^2 L)(r_p \rho^{\frac{1}{2}}/BL)$$

so that plasma radius emerges as the most critical parameter.

The maximum magnetic field for efficient Linus compression is about 200 Tesla to 250 Tesla when using an aluminum liner, which is the best choice among the relatively light, low melting point conductors in respect of flux-trapping. For purposes of discussion, an example of apparatus may employ a maximum magnetic compression field B of 200 Tesla, a beta ratio $\beta$ of one, and a maximum plasma temperature T of eight thousand electron volts (8 KeV). Then $R_n \simeq (\pi r_p^2)(5 \times 10^{20})$ neutrons/centimeter-second. Also, the liner dwell time $\tau_d \simeq 7.8 \times 10^{-6} R_p$, for plasma radius $r_p$ in centimeters. Then $$\Gamma_n \tau_d = 1.95 \times 10^{15} r_p^3 / x_n \text{ (neutrons/cm}^2\text{/pulse)}$$

Since $x_n \simeq 30$ cm, we have $\Gamma_n \tau_d = 6.5 \times 10^{13} r_p^3$ neutrons/cm$^2$/pulse. It should be noted that a plasma radius $r_p$ in the range of about 1 centimeter (1 cm is a conventional plasma radius design parameter in implosion power reactors of the Linus type) results in low average neutron fluxes or unconventionally high repetition rates. However, if a substantially larger plasma radius $r_p$ is provided such as at about 3 centimeters or more, then $\Gamma_n \tau_d = 1.76 \times 10^{15}$, and the average flux will exceed $10^{16}$ cm$^{-2}$s$^{-1}$ at a practical, conventional repetition rate of six pulses per second. Slightly larger plasma radii $r_p$ may be employed to provide even higher fluxes and/or lower repetition rates.

A mass plugged, but thermally open, $\theta$-pinch reactor adapted to operate with a magnetic field of 200 Tesla and a beta ratio of about 1 will be about 35 meters long. Therefore, the neutron production may be represented as:

$$\dot{N}\tau_d = RL\tau_d = 4.3 \times 10^{19} r_p^3$$

Evaluating again for $r_p = 3$ centimeters, we find $\dot{N}_n = 1.1 \times 10^{21}$ neutrons/pulse = 0.0019 mole/pulse. At a pulse repetition rate of six pulses per second, $3.6 \times 10^5$ mole/year of neutrons are provided. Thus, even at 50% neutron efficiency, two devices such as the waste burner apparatus 10 illustrated in FIG. 1 may be capable of inactivating most of the cesium[137] and strontium[90] radioactive fission wastes projected for the year 2000.

The treatment of nuclear waste materials may be carried out by including such materials as radioactive salts in a molten salt layer of the stratified blanket design. Molten salts of radioactive wastes have a wide range of solubilities and miscibilities, for example with alkali and alkali earth halides. Furthermore, fused salt nuclear waste blanket layers may be provided to carry useful concentrations of fission wastes other than or in addition to radioactive cesium and strontium.

In connection with the provision of fused halide nuclear waste treatment layers, it is desirable that chlorine not be used as a salt anion component because of production of chlorine[36], which has a half life of $3 \times 10^5$ years. Fluorine is ideal for low activation, with most neutron reactions leading either to stable or very short-lived products. However, the high melting points of many fluorides is a disadvantage. The bromine neutron reaction chain can lead to selenium[75], but with a half life of 120 days for this selenium isotope, this is not an overwhelming problem. Bromides have lower melting points and add desirable mass to the blanket. The iodine neutron reaction chain will generate small quantities of iodine[129] ($\frac{1}{2} = 1.7 \times 10^7$ years), which is undesirable because of its biological impact. Bromides and fluorides are therefore the best choice of halide anions for molten salt components of the liquid liner.

Properties of some possible liner component materials are given in the following table:

TABLE I
PHYSICAL PROPERTIES OF SOME BLANKET SUBSTANCES

| Substance | Mass Density at 20° C. | Melting Point | Boiling Point |
|---|---|---|---|
| Mg | 1.74 g/cm$^3$ | 651° C. | 1107° C. |
| Al | 2.7 | 660 | 2467 |
| Li | 0.53 | 179 | 1317 |
| Sr | 2.6 | 774 | 1366 |
| SrF$_2$ | 4.24 | 1450 | 2489 |
| SrBr$_2$ | 4.22 | 643 | Decomposes |
| CsF | 4.12 | 682 | 1251 |
| CsBr | 4.44 | 636 | 1300 |
| LiF | 2.63 | 842 | 1676 |
| LiBr | 3.46 | 547 | 1265 |

In connection with flux-trapping layer materials for radioactive waste treatment applications, aluminum is a good conductor, has a suitable melting and a high boiling point, has a fairly low compressibility, and therefore is an excellent liner material. However, there will be considerable aluminum[26] generated by the (n, 2n) reaction and this isotope has a half life of about $7 \times 10^5$ years. Magnesium may be used in the thin flux-trapping layer, as the magnesium chain leads to much less long-term activation; however, magnesium is inferior to aluminum in respect of functional properties as a flux-trapping liner material. In order to utilize aluminum, it may be acceptable in certain embodiments to use an aluminum liner and let a second (n, 2n) reaction transmute Al[26] to Al[25]. Because of the small volume of the flux-trapping liner layer material compared to the volume of the entire liquid liner including the nuclear waste layer, the total radioactivity in the reactor is not substantially affected by this choice. The inclusion of lithium salts in the fused salt layer will help to shield the stator compression mechanism. The outer molten metal layer will additionally serve to further isolate the stator mechanism from the highly radioactive blanket as previously discussed. Tin or mercury chains have low long-term activation. Tin is a less expensive material than mercury, and is accordingly a preferred material.

It will be appreciated that the present invention provides improved blanket designs for implosing liner systems which have utility in treating and inactivating radioactive fission waste materials. Systems including the present blanket design find further utility in the compression of magnetic fields to provide high magnetic intensity values, for example for testing materials to determine material properties at very high magnetic intensities, or for carrying out processes requiring high magnetic fields.

In addition to the utility in the provision of very strong pulsed compressional forces and magnetic fields, the present invention is useful in plasma producing systems, and such plasmas may be used for purposes known in the plasma art. Such systems may find particular utility in the study and analysis of the properties and behaviors of plasmas which are magnetically confined at relatively high beta ratios, and as analytical tools and instrumentation in respect of matter in the plasma state. In this connection, the apparatus may be provided with conventional diagnostic and measurement elements including magnetic probes, inductive pickup loops, practicle detectors, photographic and spectrographic systems, microwave and infra-red detection systems and other appropriate elements, the data outputs of which may be utilized directly or recorded, such as by transient data recorders.

While the invention has been particularly described with respect to particular embodiments, it will be appreciated that various alternatives, modifications and adaptations will be made apparent in view of the present disclosure and may be utilized within the spirit and scope of the present invention.

Various of the features of the invention are set forth in the following claims.

What is claimed is:

1. In a method for compressing an axial magnetic field by rapidly imploding a conductive liner radially surrounding the magnetic field, the improvement comprising the steps of rotating a thick, liquid liner to provide a cylindrical vortex zone for said axial magnetic field along the axis of the liner, said liner having an inner, conductive, flux-trapping liquid metal layer adjacent the vortex zone, an intermediate molten salt layer radially outward from said flux-trapping layer, and an outer layer of a denser electrically conductive liquid metal, each of said layers being substantially immiscible with each of said layers adjacent thereto, rapidly imploding said stratified liquid liner by compressing said dense liquid metal outer layer and transmitting said compression forces to said flux trapping layer through said molten salt layer to compress said axial magnetic field.

2. A method in accordance with claim 1 wherein a fusible plasma is confined in said axial vortex zone, and wherein said plasma is compressed to nuclear reaction temperature.

3. A method in accordance with claim 2 wherein said liquid fused salt intermediate layer contains radioactive waste materials wherein the compressed plasma produces a high density neutron flux and wherein said waste materials are transmuted to less radioactive materials by the action of the neutron flux.

4. A method in accordance with claim 3 wherein said plasma is a deuterium-tritium plasma, wherein the compressed plasma radius is at least about 3 cm.

5. A method in accordance with claim 3 wherein said flux trapping layer has an imploded thickness of at least about 0.5 cm, and wherein said intermediate salt layer has an imploded thickness of at least about 20 cm.

6. A method in accordance with claim 1 wherein the ratio of the diameter of the vortex zone before implosion to the diameter of the vortex zone at maximum implosion is at least about 10.

7. In an apparatus for compressing an axial magnetic field comprising a liquid liner and means for containing said liquid liner within an elongated bore, means for providing a magnetic field along the axis of said bore, means for rotating said liquid liner within said containment means to provide a vortex zone within said liner along the axis of rotation, and means for rapidly imploding said liner to compress the magnetic field, the improvement comprising said liquid liner being a stratified liquid liner being provided as a plurality of immiscible layers for optimizing liner performance including an inner liquid metal flux-trapping layer, an intermediate, nonconducting molten salt layer having a density greater than the density of the flux-trapping layer, and an outer heavy, liquid metal layer having a density greater than that of the molten salt layer.

* * * * *